United States Patent
Drako et al.

(10) Patent No.: US 11,580,060 B2
(45) Date of Patent: Feb. 14, 2023

(54) POLICY DRIVEN LATENCY CONTROL APPLIED TO A VEHICULAR REAL TIME NETWORK APPARATUS

(71) Applicant: Drako Motors, Inc., Austin, TX (US)

(72) Inventors: Dean Drako, Austin, TX (US);
Shivinder Singh Sikand, Austin, TX (US)

(*) Notice: Subject to any disclaimer, the term of this patent is extended or adjusted under 35 U.S.C. 154(b) by 10 days.

(21) Appl. No.: 17/321,415

(22) Filed: May 15, 2021

(65) Prior Publication Data
US 2022/0261374 A1 Aug. 18, 2022

Related U.S. Application Data

(60) Provisional application No. 63/149,224, filed on Feb. 13, 2021.

(51) Int. Cl.
*G06F 15/82* (2006.01)
*G06F 13/10* (2006.01)
*G06F 9/4401* (2018.01)

(52) U.S. Cl.
CPC .......... *G06F 15/82* (2013.01); *G06F 9/441* (2013.01); *G06F 13/102* (2013.01)

(58) Field of Classification Search
None
See application file for complete search history.

(56) References Cited

U.S. PATENT DOCUMENTS

2009/0157936 A1* 6/2009 Goss .............. G06F 21/74
  713/300
2012/0060168 A1* 3/2012 Lee .............. G06F 9/5077
  718/104

(Continued)

OTHER PUBLICATIONS

Muraoka, M, et al., Design Methodology for SoC Architectures based on Reusable Virtual Cores, 2004, IEEE, pp. 256-262. (Year: 2004).*

(Continued)

*Primary Examiner* — Eric Coleman
(74) *Attorney, Agent, or Firm* — Patentry; Peter G. H. Hwang

(57) ABSTRACT

A system includes a real-time partitioning separation kernel installed on a multi-core processor. Guest operating systems are hosted with in hardware virtualized machines in the cores. Another hardware virtualized machine performs a real-time USB-CAN interface communicatively coupled to distributed electronic control units which acquire data and command actuators. A plurality of hardware virtualized machines support processes of various criticality. A secure shared memory serves as the communication means between processes performing different levels of functionality at suitable latency ranges. a policy to distinguish, allocate, and distribute clock, memory, and input/output resources to meet focused latency ranges to the Observation, Decision, and Execution processes. Remaining resources have diffuse latency ranges made available to the Observation, Decision, and Execution processes in an as available but guarded minimum and maximum buffet. A latency policy ensures that each process receives its minimum tranche before queueing for up to the maximum at the resource buffet.

4 Claims, 4 Drawing Sheets

(56) References Cited

U.S. PATENT DOCUMENTS

| | | | |
|---|---|---|---|
| 2012/0084777 A1* | 4/2012 | Jayamohan | G06F 9/5077 |
| | | | 718/1 |
| 2015/0007196 A1* | 1/2015 | Toll | G06F 9/5088 |
| | | | 718/105 |
| 2016/0085572 A1* | 3/2016 | Hotra | G06F 9/4887 |
| | | | 718/1 |
| 2017/0177415 A1* | 6/2017 | Dhanraj | G06F 9/5044 |
| 2019/0102229 A1* | 4/2019 | Gupta | G06F 9/5027 |
| 2019/0102303 A1* | 4/2019 | Wang | G06F 12/0862 |
| 2019/0258251 A1* | 8/2019 | Ditty | G06V 20/58 |

OTHER PUBLICATIONS

Kondo, H. et al., A 28-nm Automotive Flash Microcontroller with Virtualization-Assisted Processor Supporting ISO26262 Asil D, Jan. 2020, IEEE, pp. 133-144. (Year: 2020).*

Burgio, P., et al., A software stack for next-generation automotive system on many-core heterogeneous platforms, 2017, Elsevier, pp. 299-311. (Year: 2017).*

Gu, Z. et al., A State-of-the-Art Survey on Real-Time Issues in Embedded Systems Virtualization, Scientific Research Open Access, Journal of Software Engineering and Applications, vol. 5, No. 4, 2012, 19 pages. (Year: 2012).*

Pinto, S et al., Lightweight Multicore Virtualization Architecture exploiting ARM TrustZone, 2017, IEEE, pp. 3562-3567. (Year: 2017).*

* cited by examiner

POLICY DRIVEN LATENCY CONTROL APPLIED TO A VEHICULAR REAL TIME NETWORK APPARATUS

CROSS-REFERENCE TO RELATED APPLICATIONS

This non-provisional utility application benefits from provisional application Ser. No. 63/149,224 Real Time Latency Guaranteed Architecture for Automotive I/O Systems filing date Feb. 13, 2021.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable

INCORPORATION-BY-REFERENCE OF MATERIAL SUBMITTED ON A COMPACT DISK OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

Technical Field

The present invention relates to automotive electronic control units (ECOs) and real-time networks in vehicle control systems. Additionally, vehicles are becoming more computer like and taking advantage of graphical user interfaces, entertainment, cellular radio, and Global Positioning Satellites.

Description of the Related Art

CAN bus or Controller Area Network is an industry standard for connecting Electronic Control Units (ECUs) in automobiles.
It is used in practically all vehicles due to low cost, centralized operation, robustness, and efficiency. Communication over the CAN bus is done via CAN frames. USB Universal Serial Bus is a communication standard among computer equipment and inherently has one master unit. Increasingly data must cross the CAN-USB boundary in modern automobiles.

As is known, a separation kernel is a collection of distributed components assigned to domains, which appear indistinguishable from separate private machines for each component. As is known, hardware virtualization technologies isolate guest domains in separate sandboxes. A sandbox is an encapsulation of a subset of CPU cores or hardware threads, I/O devices, and regions of physical memory.

Conventional vehicle communications networks have reached an impenetrable frontier. At one industrial tier, well known production standards such as I2C, CAN, LIN, Flexray, and MOST are bandwidth limited, typically below one Megabitpersecond. At a popular higher tier, Ethernet, suffers from Real-time challenges, jitter, no bandwidth reservation or guarantee. Time-triggered Ethernet is not yet commonplace. Switched architecture is inappropriate in many aspects.

As is known, the major channels of conventional vehicle networks suffer from incompatible goals and history: The Powertrain requires a CAN/Flexray subnet for Transmission, Engine, Battery, and Alternator. The Body & Comfort depends on CAN/LIN for Windows, doors, seats, mirrors, climate, and illumination control. The Chassis/Safety with high reliability/performance needs is hitting the limits of CAN/LIN/Flexray for steering, brakes, tire pressure, and any automation/autonavigation. Finally, the Visualization channel tries to make do with Ethernet/MOST/CAN for instrument cluster, maps, and location, head up display and a head unit. All of which are only integrated for diagnostic analysis of failures or health. There is poor communication both physically and informationally among the four channels. That cannot last. More complexity is on the horizon.

But how can these islands of automation become able to take advantage of multicore gigahertz system on a chip processors?
What is needed is a system of mixing existing real-time legacy devices and operating systems with non-real-time applications in personal computer platforms without substantial recoding.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

A system enables Policy Driven Latency Control Applied To A Vehicular Real Time Network Apparatus. A system includes a real-time partitioning separation kernel installed on a multi-core processor. One aspect is virtualization, but bottlenecks between virtual systems remain to be solved. Software defined electronic control units promise increase functionality and shortened design cycles incompatibility with legacy long established standards constitute roadblocks.

One challenge is addressing the mixture of critical services and purely convenience/cosmetic features. And can the system be secure from hostile attacks? Guest operating systems are hosted with in hardware virtualized machines in the cores. Another hardware virtualized machine performs a real-time USB-CAN interface communicatively coupled to distributed electronic control units which acquire data and command actuators. A plurality of hardware virtualized machines support processes of various criticality. Visualization and entertainment have less criticality than acquiring sensor data, transforming it, and executing command and control over vehicle power and direction.

A secure shared memory serves as the communication means between processes performing different levels of functionality at suitable latency ranges. The invention uses a policy to distinguish, allocate, and distribute clock, memory, and input/output resources to meet focused latency ranges to the Observation, Decision, and Execution processes. Remaining resources have diffuse latency ranges made available to the Observation, Decision, and Execution processes in an as available but guarded minimum and maximum buffet. A latency policy ensures that each process receives its minimum tranche before queueing for up to the maximum at the resource buffet. Some processes are inherently sequential such as writing to a memory address prior to reading from that memory address. Some processes may be parallelized such an multiple processes reading from the same memory or sensor address.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

BRIEF DESCRIPTION OF THE SEVERAL VIEWS OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 1 is a block diagram of an exemplary processor means for performance of the methods and means for embodiment of the invention under executable control of instructions encoded in non-transitory media known to practitioners of data communications, video, and computation.

DETAILED DESCRIPTION OF EMBODIMENTS OF THE INVENTION

Figure 1:
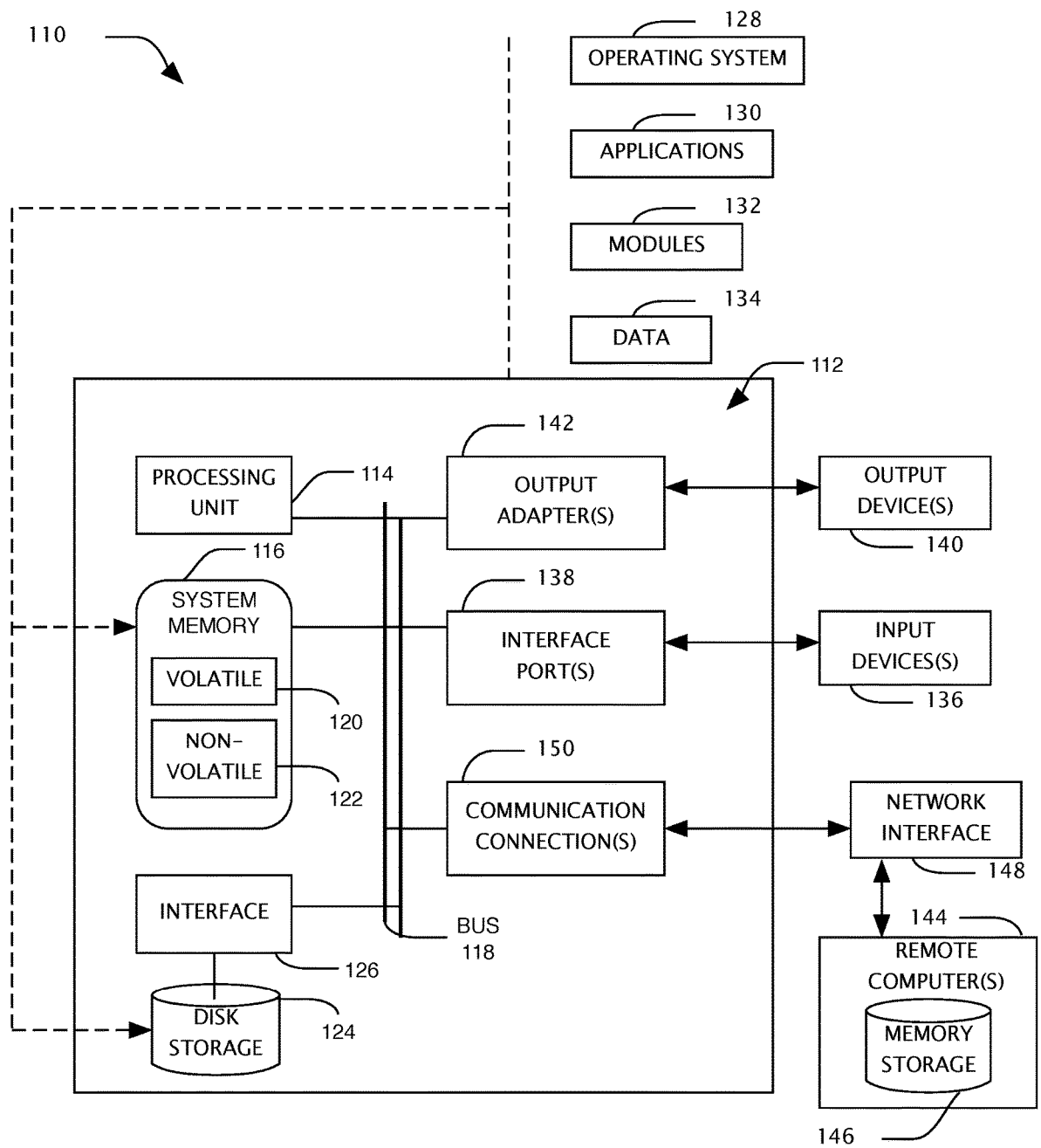
FIG. 1 illustrates an exemplary environment for implementing various aspects of the invention, e.g. a processor suitable for performing processes and method steps disclosed below.

A Clock Treasury Apparatus (CTA) includes a universal time synchronization agency and a resource prioritization agency. The CTA provides policy driven latency to an Observation Channel, a Decision Channel, and an Execution Channel.

The Observation Channel receives an allocation of diffuse clock resources and focused clock resources according to the policy driven latency chosen by the CTA which it assigns to groups of sensors and memory stores to attend to changes in measures which exceed noise and variance thresholds.

The Decision Channel receives an allocation of diffuse clock resources and focused clock resources according to the policy driven latency chosen by the CTA which it assigns to compute resources and memory access to strictly convert between bus formats within an allowed latency range and evaluate conditions for changing the state of the vehicle actuators.

The Execution Channel receives an allocation of diffuse clock resources and focused clock resources according to the policy driven latency chosen by the CTA. Commands are dispatched to vehicle actuators within latency guarantees for safety and control or when available for non-essential comfort or entertainment. The range of allowable latency is dynamically reconfigured according to changing conditions, preferences, and priorities.

The Clock Treasury Apparatus resynchronizes to available date-time signals provided externally when global positioning, cellular telephone, or wireless internet signals are available and no more urgent task is pending. Clock resynchronization is of priority inversely proportional to vehicle acceleration and velocity.

The Observation Process receives focused clock, memory, and input/output resources with policy driven ranges of maximum or minimum latency for vehicle control and safety sensors. Data can be collected and filtered several times a second. Changing data (but not noise) trigger an increased allocation of resources to acquire, store, and transform metrics. Operator selections from a console or adjustments to the interior climate may be deferred to the diffuse resource latency range.

The Decision Process transforms data and evaluates conditions for alerts or even control commands over actuators. A policy on latency provides resources to safety and motor control processes more urgently than climate or entertainment controls. Writing the results of a decision process into shared memory has tightly focused latency ranges. A latency policy for observation and decision would focus least delay for combined processing. A Decision Process determines switching among latency policies.

The Execution Process also has diffuse and focused latency ranges for clock and other resources. Steering, braking, and motor control receives the tightest range of focused latency especially at high vehicle speed. Except for rapid charging and discharging, the configuration of the batteries is generally in a category of diffuse resource control especially when responsive to operator selections at a control panel. Other processes that occur within independent processor cores can be treated as clocking a very wide instruction such as converting from USB to CAN bus formats or vice versa.

A strongly enforced focused latency policy governs transformations between CAN bus formats and USB formats especially between sensors, and actuators and intervening processes. A more relaxed or casual latency policy may be applied to non-mission critical vehicle operations such as seat adjustments, windows, lighting, entertainment, navigation, or climate.

Quenching hotspots in the energy storage system may be triggered by temperature sensor metrics rate of change while charging or discharging. Patterns of activity or inactivity in the battery array may be switched as ranges of latency override the current supply and regeneration default locations.

Unlike conventional Real Time systems, awareness of events do not interrupt or change the resource allocation in a policy driven latency control system. Each of the four major functions, Clock, Observation, Determination, and Execution have both focused and diffuse allocations of resources obedient to latency policies which may change according to selections and circumstances.

Non-limiting exemplary embodiments are provided below to assist in appreciation of the principal aspects of the invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

Figure 2:
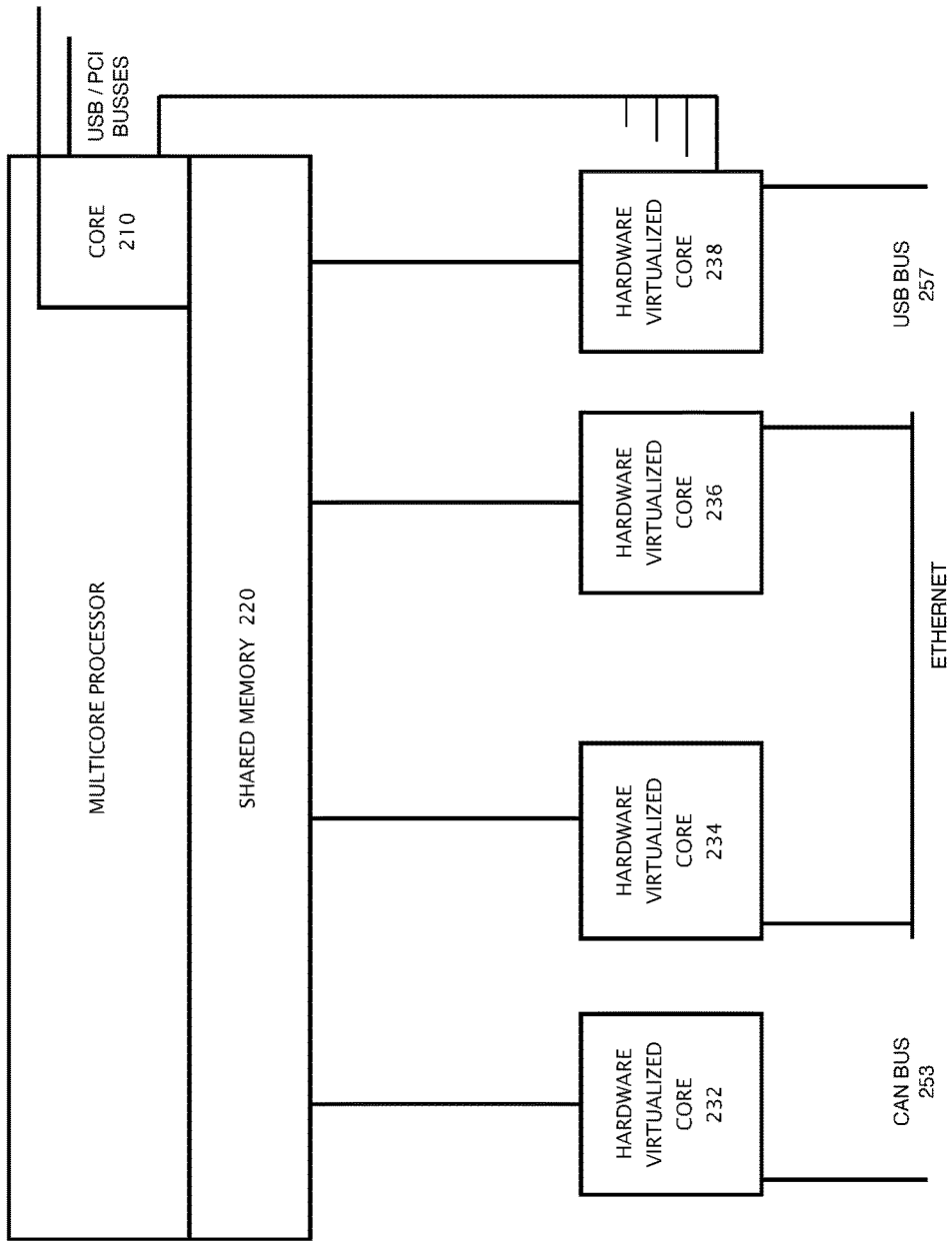
FIG. 2 is a block diagram of a system having multi-core processors and shared memory coupled to busses.

Referring to FIG. 2, an exemplary non-limiting block diagram of a multi-core processor is provided to assist in grasping some of the simplified characteristics of the invention which may be implemented using a semiconductor system on a chip 200 having a multi-core processor with at least one general purpose core 210, a shared memory 220, and a plurality of hardware virtualized cores 232-238, and furthermore a plurality of network interfaces CAN bus, USB bus, PCI, and Ethernet 251-257 communicatively coupled to the processor cores. It is understood that internal buses and signal wires (not shown) interconnect all the above components for data, signals, and control. Particularly not shown is the distribution through signal wires of policy driven latency ranges to each of the hardware virtualized cores from the general purpose core.

Figure 3:
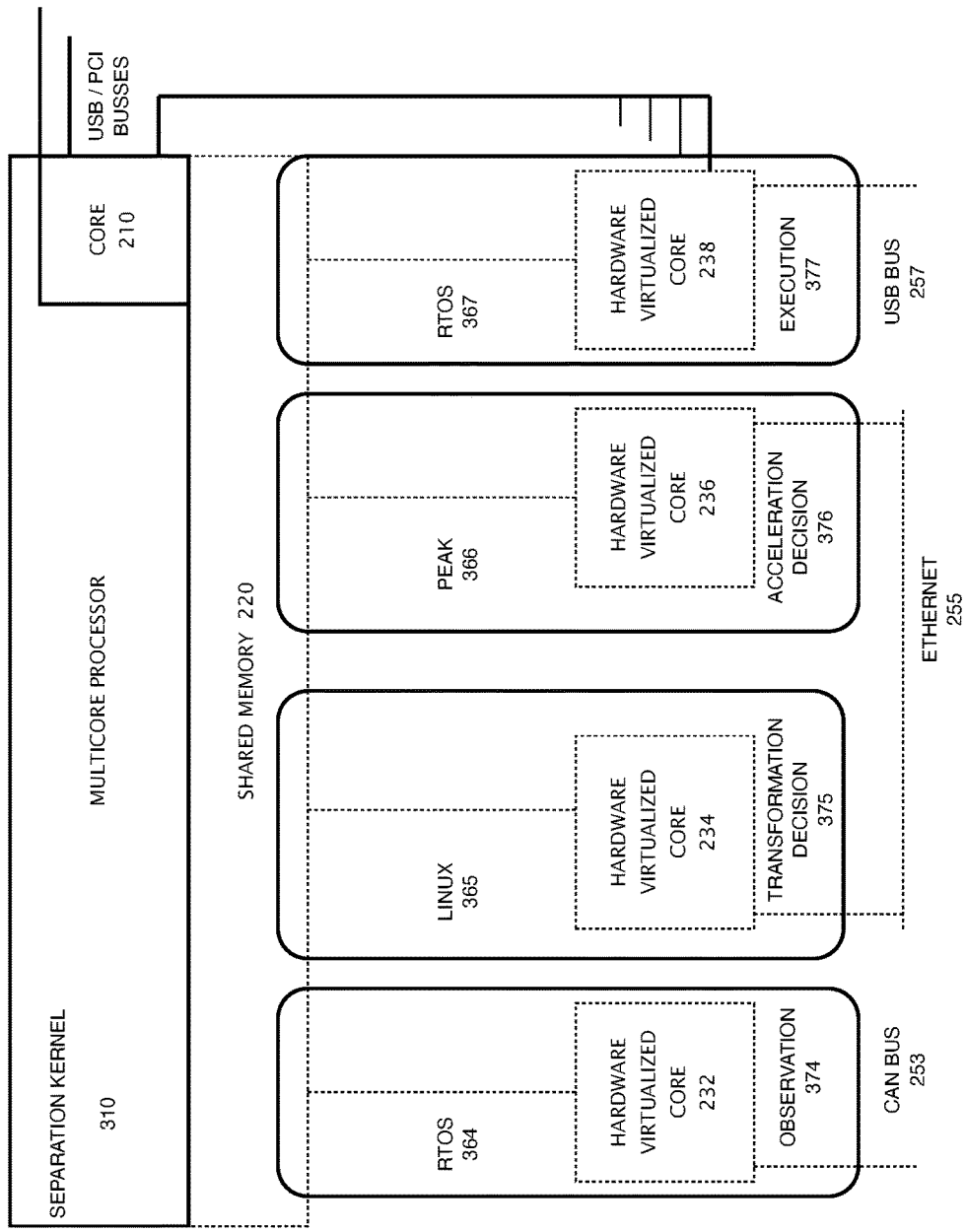
FIG. 3 is a block diagram of the operating systems and protocols instantiated on the cores.

Referring to FIG. 3, a system is shown overlaid on the apparatus of FIG. 2 which illustrates the ability to host a variety of real-time and non-real-time operating systems RTOS, LINUX, PEAK, RTOS (364-367) in the cores and a range of applications Observation 374, Transformation Decision 375, Acceleration Decision 376, and Execution 377. The applications may exchange data efficiently through writing and reading from shared memory but to ensure high throughput and guaranteed performance, receive from a separation kernel 310, a range of policy driven latencies prioritized according to their function. Similarly, their availability to utilize buses on and off the chip are regulated by the separation kernel and associated overhead services running on the general purpose core 210.

Figure 4:
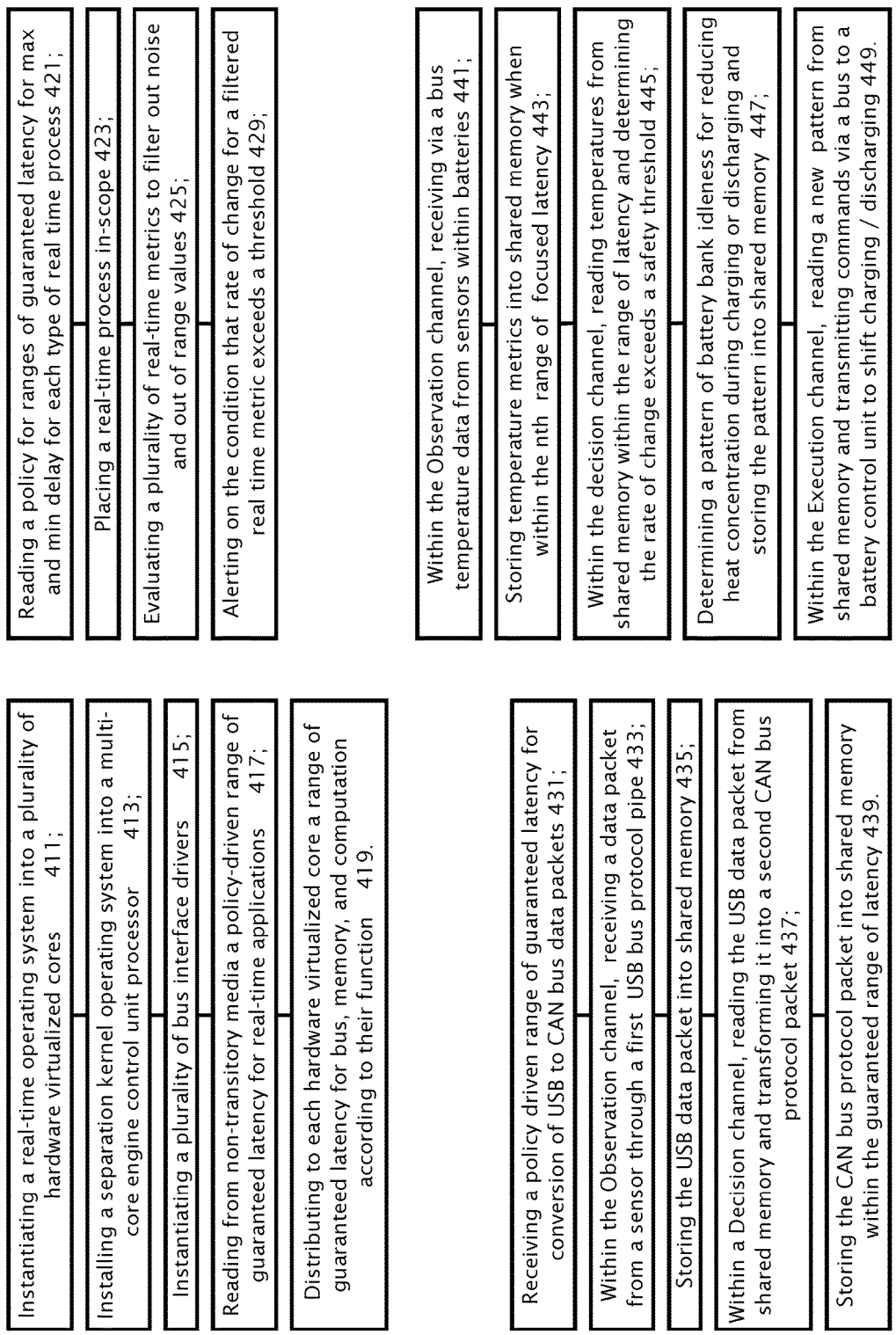
FIG. 4 is a flowchart of processes of a method embodiment of the invention.

Referring to FIG. 4, one aspect of the invention is a guaranteed latency real-time vehicle control system which includes the apparatus shown in FIGS. 2 and 3 and further including a method of operation including the following processes:

Instantiating a real-time operating system into a plurality of hardware virtualized cores 411;
Installing a separation kernel operating system into a multi-core electronic control unit processor 413;
Instantiating a plurality of bus interface drivers 415;
Reading from non-transitory media a policy-driven range of guaranteed latency for real-time applications 417; and
Distributing to each hardware virtualized core a range of guaranteed latency for bus, memory, and computation according to their function 419.

The system of claim 2 further comprises the processes
Reading a stored policy for ranges of guaranteed latency for max and min delay for placing each type of real time process 421;
Placing a real-time process in-scope 423;
Evaluating a plurality of real-time metrics to filter out noise and out of range values 425; and
Alerting on the condition that rate of change for a filtered real time metric exceeds a threshold 429.

The system of claim 3 further comprising the processes
Receiving a policy driven range of guaranteed latency for conversion of USB data packets to CAN bus data packets 431;
Within the Observation channel, receiving a data packet from a sensor through a first USB bus protocol pipe 433;
Storing the USB data packet into shared memory 435;
Within a Decision channel, reading the USB data packet from shared memory and transforming it into a second CAN bus protocol packet 437; and
Storing the CAN bus protocol packet into shared memory within the guaranteed range of latency 439.

The system of claim 4 further comprising the processes
Within the Observation channel, receiving via a bus temperature metrics from thermo sensors within at least one bank of batteries 441;
Storing temperature metrics into shared memory when within the nth range of focused latency 443;
Within the decision channel, reading temperature metrics from shared memory when within the n−1th range of focused latency and determining the rate of change exceeds a safety threshold 445;
Determining a pattern of battery bank idleness for reducing heat concentration during charging or discharging and storing the pattern into shared memory 447; and
Within the Execution channel, reading said pattern from shared memory and transmitting commands via a bus to a battery control unit to shift charging/discharging to the new pattern 449.

OTHER EMBODIMENTS

A system provides controlled heat dissipation of energy storage during rapid charging and discharging. An automotive battery is cooled by real-time intervention when sensor indicate excessive rise in temperature. Patterns such as checkboards or stripes are switched to the battery controllers to remediate potentially damaging hotspots. Frequency ad Current are controlled by real time measurement of temperature.

Real time systems within a vehicle are assign a latency budget by a policy. Each hardware virtualized core has a latency budget for focused or diffuse awareness of parameters in various sensors.

Guaranteed end to end latency in CAN to USB conversion are provided by a policy driven distribution of resources to the Observation Service, the Transformation Service, and the Execution Service to read and write from busses and to and from memory as well as a dedicated real time core.

Bus Buffer Sizes are involved in latency. By using a policy-driven Latency Budget, the system can balance buffer sizes across multiple applications and meet the policy for a selected data pipe.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

The system includes data and instructions to cause distributed processors within these apparatuses to perform the claimed method steps.

Various methodologies in accordance with the subject invention are described via a series of acts, it is to be understood and appreciated that the subject invention is not limited by the order of acts, as some acts may, in accordance with the subject invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

CONCLUSION

The object of the invention is to provide policy-driven latency budgeting to multi-core vehicle control system requiring cooperation between real-time systems and non-real-time systems.

The invention can be easily distinguished from systems that attempt to share resources by time-sharing among overcommitted and idled processes.

The invention can be easily distinguished from systems that merely provide round-robin single user access to a processor to a plurality of subscribers.

The invention can be easily distinguished from systems that have no ability to dynamically change their latency budget according to policies and circumstances.

The invention can be easily distinguished from systems that cannot mix real-time and non-real-time computing on a multicore processor.

An Exemplary Suitable Operating Environment: Computing Device

In order to provide additional context for various aspects of the subject invention, FIG. 1 and the following discussion are intended to provide a brief, general description of a suitable operating environment 110 in which various aspects of the subject invention may be implemented. While the invention is described in the general context of computer-executable instructions, such as program modules, executed by one or more computers, processors, or other devices, those skilled in the art will recognize that the invention can also be implemented in combination with other circuits, program modules, and/or as a combination of hardware and software.

Generally, however, program modules include routines, programs, objects, components, data structures, etc. that perform particular tasks or implement particular data types. The operating environment 110 is only one example of a suitable operating environment and is not intended to suggest any limitation as to the scope of use or functionality of the invention. Other well-known computer systems, environments, and/or configurations that may be suitable for use with the invention include but are not limited to, mobile phones, tablets, cloud servers, gaming devices, displays, identity credentials and their readers, cameras, attire, vehicles, medical devices, watches, robots, security instruments, weapons systems, entertainment devices, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 1, an exemplary environment 110 for implementing various aspects of the invention includes a computer 112. The computer 112 includes a processing unit also referred to as a core 114, a system memory 116, and a system bus 118. The system bus 118 couples system components including, but not limited to, the system memory 116 to the processing unit 114. The processing unit 114 can be any of various available processors. Dual microprocessors and multi-core architectures also can be employed as the processing unit 114. Within this application the term "processor" also refers to implementations of 112 in highly integrated embodiments such as ARM cores.

The system bus 118 can be any of several types of bus structure(s) including the memory bus or memory controller, a peripheral bus or external bus, and/or a local bus using any variety of available bus architectures including, but not limited to Controller Area Network (CAN), 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 116 includes volatile memory 120 and nonvolatile memory 122. The basic input/output system (BIOS), containing the basic routines to transfer information between elements within the computer 112, such as during start-up, is stored in nonvolatile memory 122. By way of illustration, and not limitation, nonvolatile memory 122 can include read only memory (ROM), programmable ROM (PROM), electrically programmable ROM (EPROM), electrically erasable ROM (EEPROM), or flash memory. Volatile memory 120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 112 also includes removable/nonremovable, volatile/nonvolatile computer storage media. FIG. 1 illustrates, for example a disk storage 124. Disk storage 124 includes, but is not limited to, devices like a magnetic disk drive, floppy disk drive, solid state drive, flash memory card, or memory stick. In addition, disk storage 124 can include storage media separately or in combination with other storage media including, but not limited to, network storage, array of disks, or quantum storage. To facilitate connection of the disk storage devices 124 to the system bus 118, a removable or non-removable interface is typically used such as interface 126.

It is to be appreciated that FIG. 1 describes software that acts as an intermediary between users and the basic computer resources described in suitable operating environment 110. Such software includes an operating system 128 which may be a real-time operating system or an non-real-time operating system. Operating system 128, which can be stored on non-transitory media such as disk storage 124, acts to control and allocate resources of the computer system 112. System applications 130 take advantage of the management of resources by operating system 128 through program modules 132 and program data 134 stored either in system memory 116 or on disk storage 124. It is to be appreciated that the subject invention can be implemented with various operating systems or combinations of operating systems, virtual machines, and virtual machine images.

A user enters commands or information into the computer 112 through input device(s) 136. Input devices 136 include, but are not limited to, a radio, magnetic, or optical scanner, a pointing device such as, mouse, trackball, stylus, touch pad, keyboard, microphone, joystick, game pad, satellite dish, scanner, TV tuner card, digital camera, digital video camera, web camera, and the like. These and other input devices connect to the processing unit 114 through the system bus 118 via interface port(s) 138. Interface port(s) 138 include, for example, HDMI, a serial port, a parallel port, a game port, and a universal serial bus (USB). Output device(s) 140 use some of the same type of ports as input device(s) 136. Thus, for example, a USB port may be used to provide input to computer 112, and to output information from computer 112 to an output device 140. Output adapter 142 is provided to illustrate that there are some output devices 140 like High Definition Televisions (HDTV), monitors, speakers, and printers among other output devices 140 that require special adapters. The output adapters 142 include, by way of illustration and not limitation, video and sound cards that provide a means of connection between the output device 140 and the system bus 118. It should be noted that other devices and/or systems of devices provide both input and output capabilities such as remote computer(s) 144.

Computer 112 can operate in a networked environment using logical connections to one or more remote computers, such as remote computer(s) 144. The remote computer(s) 144 can be a cloud service, personal computer, a server, a router, a network PC, a workstation, a microprocessor based appliance, a peer device or other common network node and the like, and typically includes many or all of the elements described relative to computer 112. For purposes of brevity, only a memory storage device 146 is illustrated with remote computer(s) 144. Remote computer(s) 144 is logically connected to computer 112 through a network interface 148 and then physically connected via communication connection 150. Network interface 148 encompasses communication networks such as cellular data, Wi-Fi, Bluetooth, Near Field Communications, local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, mesh, IP, point-to-point links, circuit switching networks like Integrated Services Digital Networks (ISDN) and variations thereon, packet switching networks, and Digital Subscriber Lines (DSL).

Communication connection(s) 150 refers to the hardware/software employed to connect the network interface 148 to the bus 118 such as a USB or CAN. While communication connection 150 is shown for illustrative clarity inside computer 112, it can also be external to computer 112. The hardware/software necessary for connection to the network interface 148 includes, for exemplary purposes only, internal and external technologies such as, modems including satellite, 802.11, CDMA, regular telephone grade modems, cable modems and DSL modems, ISDN adapters, and Ethernet cards.

Spirit and Scope of the Appended Claims

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for guaranteed latency real-time vehicle control comprising:
   a semiconductor system-on-a-chip having a multi-core processor with at least one general purpose core, a shared memory, a plurality of hardware virtualized cores, a plurality of network interfaces communicatively coupled to the processor cores, internal buses and signal wires interconnecting all the above components for data, signals, and control of policy driven latency ranges to each of the hardware virtualized cores from the general purpose core;
   a variety of real-time and non-real-time operating systems RTOS, LINUX, PEAK, RTOS in the cores and
   a range of applications Observation, Transformation Decision, Acceleration Decision, and Execution, said applications configured to exchange data efficiently through writing and reading from shared memory but to ensure high throughput and guaranteed performance, receiving from a separation kernel, a range of policy driven latencies prioritized according to their function; and further including
   a method of operation including the following processes:
   instantiating a real-time operating system into a plurality of hardware virtualized cores;
   installing a separation kernel operating system into a multi-core electronic control unit processor;
   instantiating a plurality of bus interface drivers;
   reading from non-transitory media a policy-driven range of guaranteed latency for real-time applications; and
   distributing to each hardware virtualized core a range of guaranteed latency for bus, memory, and computation according to their function.

2. The system of claim 1 further comprising the processes:
   reading a stored policy for ranges of guaranteed latency for max and min delay for placing each type of real time process;
   placing a real-time process in-scope;
   evaluating a plurality of real-time metrics to filter out noise and out of range values;
   alerting on the condition that rate of change for a filtered real time metric exceeds a threshold.

3. The system of claim 2 further comprising the processes:
   receiving a policy driven range of guaranteed latency for conversion of USB data packets to CAN bus data packets;
   within the Observation channel, receiving a data packet from a sensor through a first USB bus protocol pipe;
   storing the USB data packet into shared memory;
   within a Decision channel,
   reading the USB data packet from shared memory and transforming it into a second CAN bus protocol packet; and
   storing the CAN bus protocol packet into shared memory within the guaranteed range of latency.

4. The system of claim 3 further comprising the processes within the Observation channel,
   receiving via a bus temperature metrics from thermo sensors within at least one bank of batteries;
   storing temperature metrics into shared memory when within the nth range of focused latency;
   within the decision channel, reading temperature metrics from shared memory when within the n–1th range of focused latency and determining the rate of change exceeds a safety threshold;
determining a pattern of battery bank idleness for reducing heat concentration during charging or discharging and storing the pattern into shared memory; and within the Execution channel,
reading said pattern from shared memory and
transmitting commands via a bus to a battery control unit to shift charging/discharging to the new pattern.

* * * * *